No. 850,296. PATENTED APR. 16, 1907.
W. C. COOK.
HARROW.
APPLICATION FILED OCT. 29, 1906.
2 SHEETS—SHEET 1.
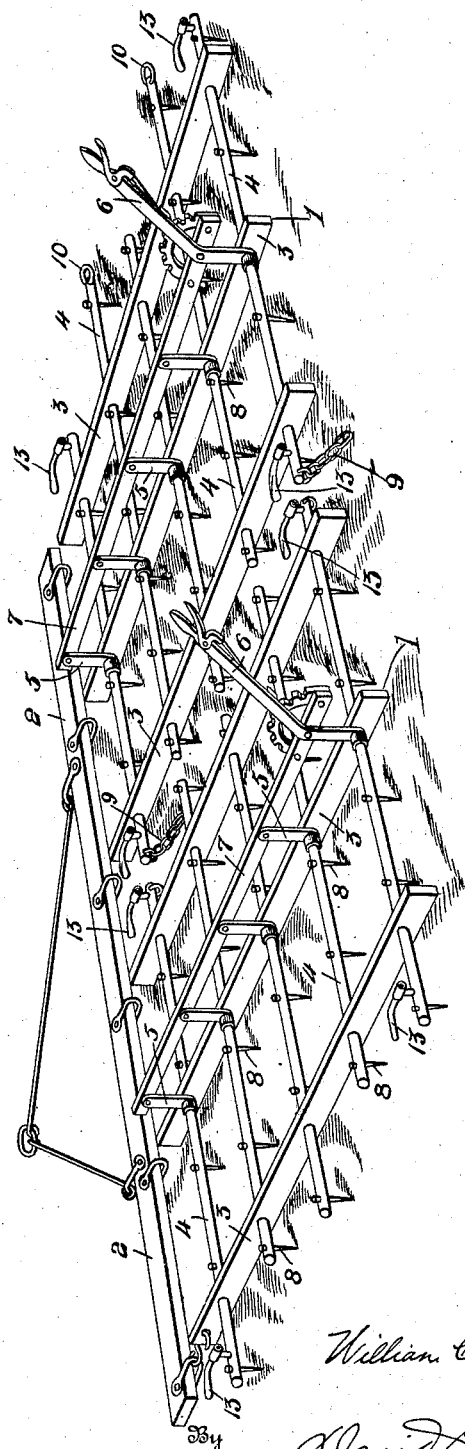
Witnesses
B. M. Offutt.
G. M. Spring.
Inventor
William C. Cook,
By David C. Moore.
His Attorney No. 850,296. PATENTED APR. 16, 1907.
W. C. COOK.
HARROW.
APPLICATION FILED OCT. 29, 1906.
2 SHEETS—SHEET 2.
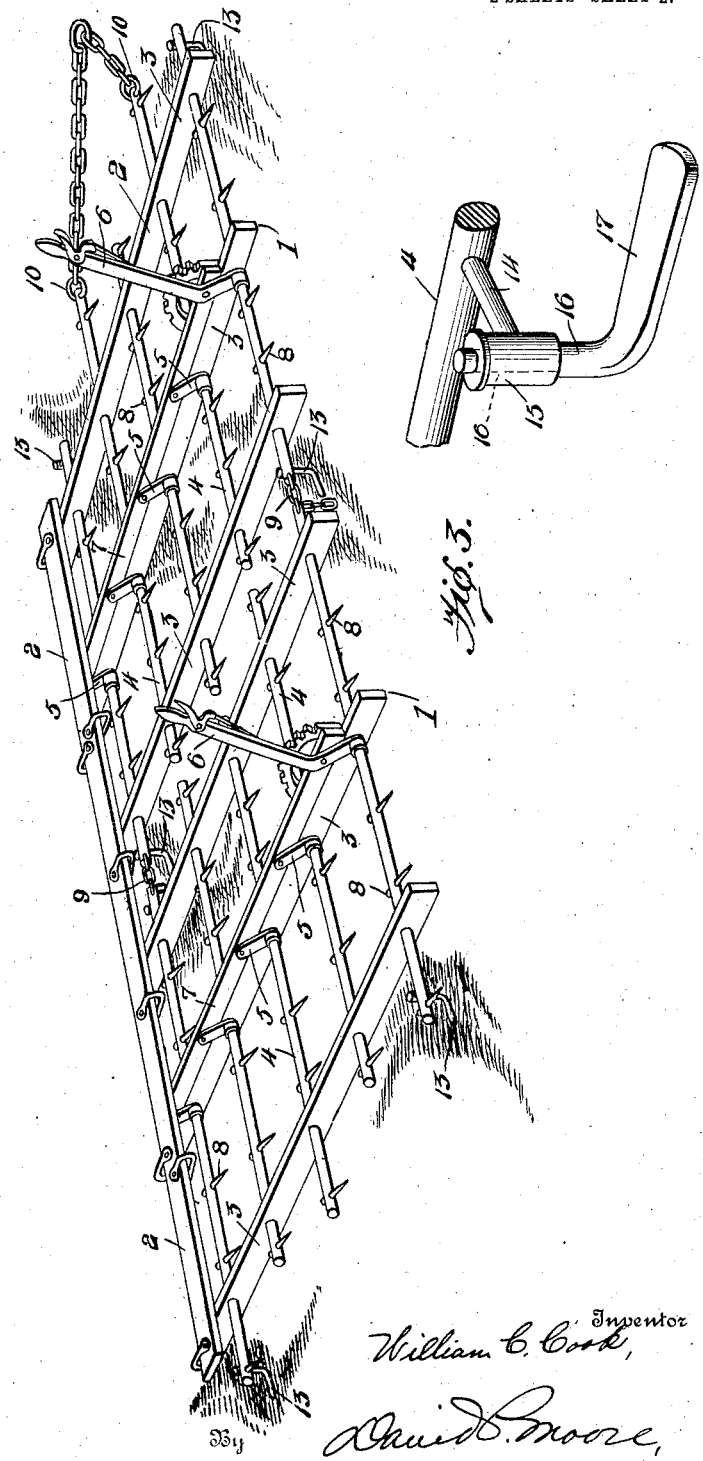
Witnesses
B. M. Offutt,
G. M. Spring.
Inventor
William C. Cook,
By David L. Moore,
his Attorney

UNITED STATES PATENT OFFICE.

WILLIAM C. COOK, OF SCHALLER, IOWA.

HARROW.

No. 850,296.  Specification of Letters Patent.  Patented April 16, 1907.

Application filed October 29, 1906. Serial No. 341,086.

*To all whom it may concern:*

Be it known that I, WILLIAM C. COOK, a citizen of the United States, residing at Schaller, in the county of Sac and State of Iowa, have invented certain new and useful Improvements in Harrows, of which the following is a specification, reference being had therein to the accompanying drawings.

My present invention relates to improvements in harrows; and the main object of my invention is the provision of an attachment therefor whereby sectional harrows do not have to be taken apart in transporting the harrow from field to field, over roads and bridges, and through gateways. To this end I provide means for securing the sections end to end and means for disengaging the harrow-teeth from the ground and placing in their stead runners, the said runners being of a new and novel construction.

To more clearly illustrate my invention, attention is invited to the accompanying drawings, in which—

Figure 1 is a perspective view of the sectional harrow with the teeth as in use. Fig. 2 is a similar view with the teeth out of use and the "runners" in operation, and Fig. 3 is an enlarged detail view of one of the runners.

Referring to the drawings, the numeral 1 designates the sections of the harrow provided with the usual "evener" 2 connected thereto. Each section consists of the transverse bars 3, in which are rotatably mounted the teeth-carrying bars 4, the levers 5 being connected to the main lever 6 through the medium of the connecting rod or link 7, so that all bars may be rotated simultaneously to present the teeth 8 to or remove them from the ground. When the sections of the harrow are in use, as shown in Fig. 1, the chains 9 for connecting the sections together when being moved endwise are loose; but when the harrow is to be transported from field to field these chains form a connection between the sections, while to the eyes or rings 10, carried by one section, is connected any means whereby the sections may be drawn endwise. When in this position, the teeth-carrying bars are rotated, so that the teeth assume the position shown in Fig. 2, while the runners 13 contact the ground and carry the weight of the sections during such transportation. These runners may be of any desired construction and attached in any desired manner to the teeth-carrying bars, it being necessary to so mount them that when the teeth are in contact with the ground the runners are out of contact, and vice versa.

In Fig. 3 I have illustrated the preferred form of runner, which consists of the bolt 14, by means of which the device is secured to one of the bars 4, preferably the outside one, as clearly illustrated in Figs. 1 and 2. This bolt is provided with the enlargement or head 15, provided with a channel or opening 16, in which is pivotally or swivelly mounted the stem 16′ of the runner or shoe 17.

From the foregoing description, taken in connection with the drawings, it is evident that I provide a means whereby sectional harrows may be dragged from field to field, over roads, bridges, and through gateways without the necessity of disengaging the sections and placing them in a vehicle for transportation, thus providing a time-saver and a simple and practical device of this character.

What I claim is—

1. A swiveled runner for sectional harrows adapted to be attached to the pivoted tooth-carrying bars thereof.

2. A runner attachment for sectional harrows consisting of an arm having an eyed head, and a stem carrying a curved shoe swivelly held in said eyed head, for the purpose set forth.

In testimony whereof I affix my signature in presence of two witnesses.

WILLIAM C. COOK.

Witnesses:
 J. B. DAKIN,
 F. H. MCCRAY.